United States Patent
Tsou et al.

(10) Patent No.: US 9,641,086 B2
(45) Date of Patent: May 2, 2017

(54) OSCILLATOR APPLIED TO A CONTROL CIRCUIT OF A POWER CONVERTER AND CONTROL METHOD THEREOF

(71) Applicant: Leadtrend Technology Corp., Hsin-Chu (TW)

(72) Inventors: Ming-Chang Tsou, Hsin-Chu (TW); Meng-Jen Tsai, Hsin-Chu (TW); Chih-Chi Chang, Hsin-Chu (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 14/824,100

(22) Filed: Aug. 12, 2015

(65) Prior Publication Data

US 2016/0049863 A1 Feb. 18, 2016

Related U.S. Application Data

(60) Provisional application No. 62/036,632, filed on Aug. 13, 2014.

(51) Int. Cl.
*H02M 3/33* (2006.01)
*H02M 3/335* (2006.01)
*H02M 1/00* (2006.01)

(52) U.S. Cl.
CPC ............. *H02M 3/33507* (2013.01); *H02M 2001/0025* (2013.01); *H02M 2001/0048* (2013.01); *Y02B 70/1491* (2013.01)

(58) Field of Classification Search
CPC ..... H02M 3/33507; H02M 2001/0025; H02M 2001/0048
USPC .... 327/108, 109, 110, 111, 112; 363/95, 96, 363/97
See application file for complete search history.

(56) References Cited

U.S. PATENT DOCUMENTS 8,339,815 B2 * 12/2012 Lee ................... H02M 3/33523
363/21.15

* cited by examiner

*Primary Examiner* — John Poos
(74) *Attorney, Agent, or Firm* — Winston Hsu; Scott Margo

(57) ABSTRACT

An oscillator applied to a control circuit of a power converter includes a compensation module and an oscillation module. The compensation module outputs or sinks an adjustment current according to a compensation voltage corresponding to a load, a direct current voltage of a primary side of the power converter, and a reference voltage. The oscillation module outputs a clock signal according to the compensation voltage, a control voltage, and the adjustment current. The control circuit generates a gate control signal to a power switch of the primary side according to the clock signal. When the compensation voltage is less than a first predetermined voltage, a frequency of the gate control signal is a first fixed value, and when the compensation voltage is between the first predetermined voltage and a second predetermined voltage and greater than the second predetermined voltage, the frequency is varied with the compensation voltage.

16 Claims, 7 Drawing Sheets

US 9,641,086 B2

OSCILLATOR APPLIED TO A CONTROL CIRCUIT OF A POWER CONVERTER AND CONTROL METHOD THEREOF

CROSS REFERENCE TO RELATED APPLICATIONS

This application claims the benefit of U.S. Provisional Application No. 62/036,632, filed on Aug. 13, 2014 and entitled "Dynamic PWM operation to improved efficiency, dynamic load and output ripple," the contents of which are incorporated herein by reference.

BACKGROUND OF THE INVENTION

1. Field of the Invention

The present invention relates to an oscillator applied to a control circuit of a power converter and a control method thereof, and particularly to an oscillator and a control method thereof that can control a frequency of a gate control signal to be varied with a compensation voltage when a load is middle or heavy.

2. Description of the Prior Art

A control circuit applied to a power converter provided by the prior art can output a pulse width modulation signal to a power switch of a primary side of the power converter in pulse width modulation mode, wherein a frequency of the pulse width modulation signal is a first fixed value when a compensation voltage corresponding to a load coupled to a secondary side of the power converter is less than a first predetermined voltage, is varied with the compensation voltage when the compensation voltage is between the first predetermined voltage and a second predetermined voltage, and is a second fixed value when the compensation voltage is greater than the second predetermined voltage. When the compensation voltage is greater than the second predetermined voltage, the load is middle or heavy, but the frequency of the pulse width modulation signal is the second fixed value, the prior art has disadvantages as follows when the compensation voltage is greater than the second predetermined voltage: first, a response of an output voltage of the secondary side of the power converter corresponding to the load is poorer; second, ripples of the output voltage cannot be suppressed; third, conversion efficiency of the power converter cannot be increased.

SUMMARY OF THE INVENTION

An embodiment of the present invention an oscillator applied to a control circuit of a power converter. The oscillator includes a compensation module and an oscillation module. The compensation module is used for outputting or sinking an adjustment current according to a compensation voltage corresponding to a load of a secondary side of the power converter, a direct current (DC) voltage of a primary side of the power converter, and a reference voltage. The oscillation module is used for outputting a clock signal according to the compensation voltage, a control voltage within the control circuit, and the adjustment current, wherein the control circuit generates a gate control signal to a power switch of the primary side of the power converter according to the clock signal. When the compensation voltage is less than a first predetermined voltage, a frequency of the gate control signal is a first fixed value, and when the compensation voltage is between the first predetermined voltage and a second predetermined voltage and greater than the second predetermined voltage, the frequency is varied with the compensation voltage.

Another embodiment provides an oscillator applied to a control circuit of a power converter. The oscillator includes an oscillation module. The oscillation module is used for outputting a clock signal according to a compensation voltage corresponding to a load of a secondary side of the power converter and at least one control voltage within the control circuit, wherein the control circuit generates a gate control signal to a power switch of a primary side of the power converter according to the clock signal. When the compensation voltage is less than a first predetermined voltage, a frequency of the gate control signal is a first fixed value, when the compensation voltage is between a second predetermined voltage and a third predetermined voltage, the frequency of the gate control signal is a second fixed value, when the compensation voltage is greater than a fourth predetermined voltage, the frequency of the gate control signal is a third fixed value, and when the compensation voltage is between the first predetermined voltage and the second predetermined voltage, and between the third predetermined voltage and the fourth predetermined voltage, the frequency is varied with the compensation voltage.

Another embodiment provides a control method of an oscillator, wherein the oscillator is applied to a control circuit of a power converter, the oscillator includes a compensation module and an oscillation module, the compensation module includes a voltage-to-current converting unit and an adjustment current generation unit, and the oscillation module includes a differential unit and a clock signal generation unit. The control method includes the compensation module outputting or sinking an adjustment current according to a compensation voltage corresponding to a load of a secondary side of the power converter, a DC voltage of a primary side of the power converter, and a reference voltage, wherein when the DC voltage is less than the reference voltage, the compensation module outputs the adjustment current, and when the DC voltage is greater than the reference voltage, the compensation module sinks the adjustment current; and the oscillation module outputting a clock signal according to the compensation voltage, a control voltage within the control circuit, and the adjustment current; wherein the control circuit generates a gate control signal to a power switch of the primary side of the power converter according to the clock signal; when the compensation voltage is less than a first predetermined voltage, a frequency of the gate control signal is a first fixed value, and when the compensation voltage is between the first predetermined voltage and a second predetermined voltage and greater than the second predetermined voltage, the frequency is varied with the compensation voltage.

The present invention provides an oscillator applied to a control circuit of a power converter and a control method thereof. The oscillator and the control method can utilize a compensation module to output or sink an adjustment current according to a compensation voltage corresponding to a load of a secondary side of the power converter, a DC voltage of a primary side of the power converter, and a reference voltage, and utilize an oscillation module to output a clock signal according to the compensation voltage, a control voltage, and the adjustment current, wherein the clock signal can be slowly varied with the compensation voltage when the load is middle or heavy. Because the clock signal can be slowly varied with the compensation voltage when the load is middle or heavy, a frequency of a gate control signal generated by a gate control signal generation unit within the control circuit to a power switch of the primary side of the power converter can be also slowly varied with the compensation voltage when the load is middle or heavy. Because the frequency of the gate control signal can be also slowly varied with the compensation voltage when the load is middle or heavy, compared to the prior art, the present invention has advantages as follows: first, a response of an output voltage of the secondary side of the power converter corresponding to the load is better; second, ripples of the output voltage can be suppressed; third, conversion efficiency of the power converter can be increased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
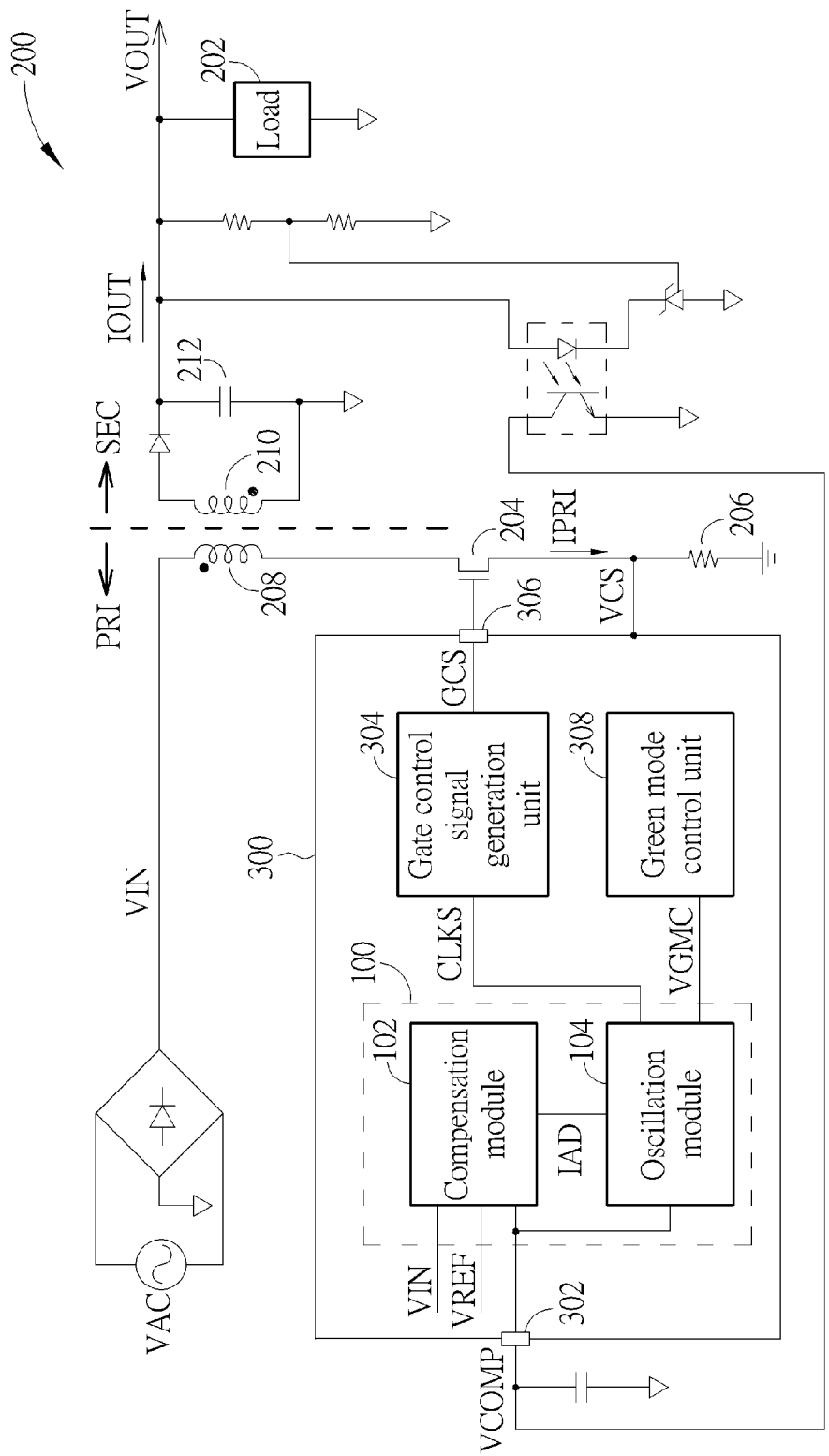
FIG. 1 is a diagram illustrating an oscillator applied to a control circuit of a power converter according to a first embodiment of the present invention.

Please refer to FIG. 1. FIG. 1 is a diagram illustrating an oscillator 100 applied to a control circuit 300 of a power converter 200 according to a first embodiment of the present invention. As shown in FIG. 1, the oscillator 100 includes a compensation module 102 and an oscillation module 104. The compensation module 102 is used for outputting or sinking an adjustment current IAD according to a compensation voltage VCOMP corresponding to a load 202 of a secondary side SEC of the power converter 200, a direct current (DC) voltage VIN of a primary side PRI of the power converter 200, and a reference voltage VREF, wherein the DC voltage VIN corresponds to an alternating current voltage VAC, the compensation module 102 receives the compensation voltage VCOMP through a compensation pin 302, and in one embodiment of the present invention, the reference voltage VREF can be equal to 100V. But, the present invention is not limited to the reference voltage VREF being 100V. The oscillation module 104 is used for outputting a clock signal CLKS to a gate control signal generation unit 304 of the control circuit 300 according to the compensation voltage VCOMP, a control voltage VGMC, and the adjustment current IAD, wherein the gate control signal generation unit 304 can generate a gate control signal GCS according to the clock signal CLKS, the gate control signal GCS is transmitted to a power switch 204 of the primary side PRI of the power converter 200 through a gate pin 306, a frequency FR of the gate control signal GCS corresponds to the clock signal CLKS, the gate control signal GCS is a pulse width modulation signal, and the control voltage VGMC is generated by a green mode control unit 308 included in the control circuit 300.

Figure 2:
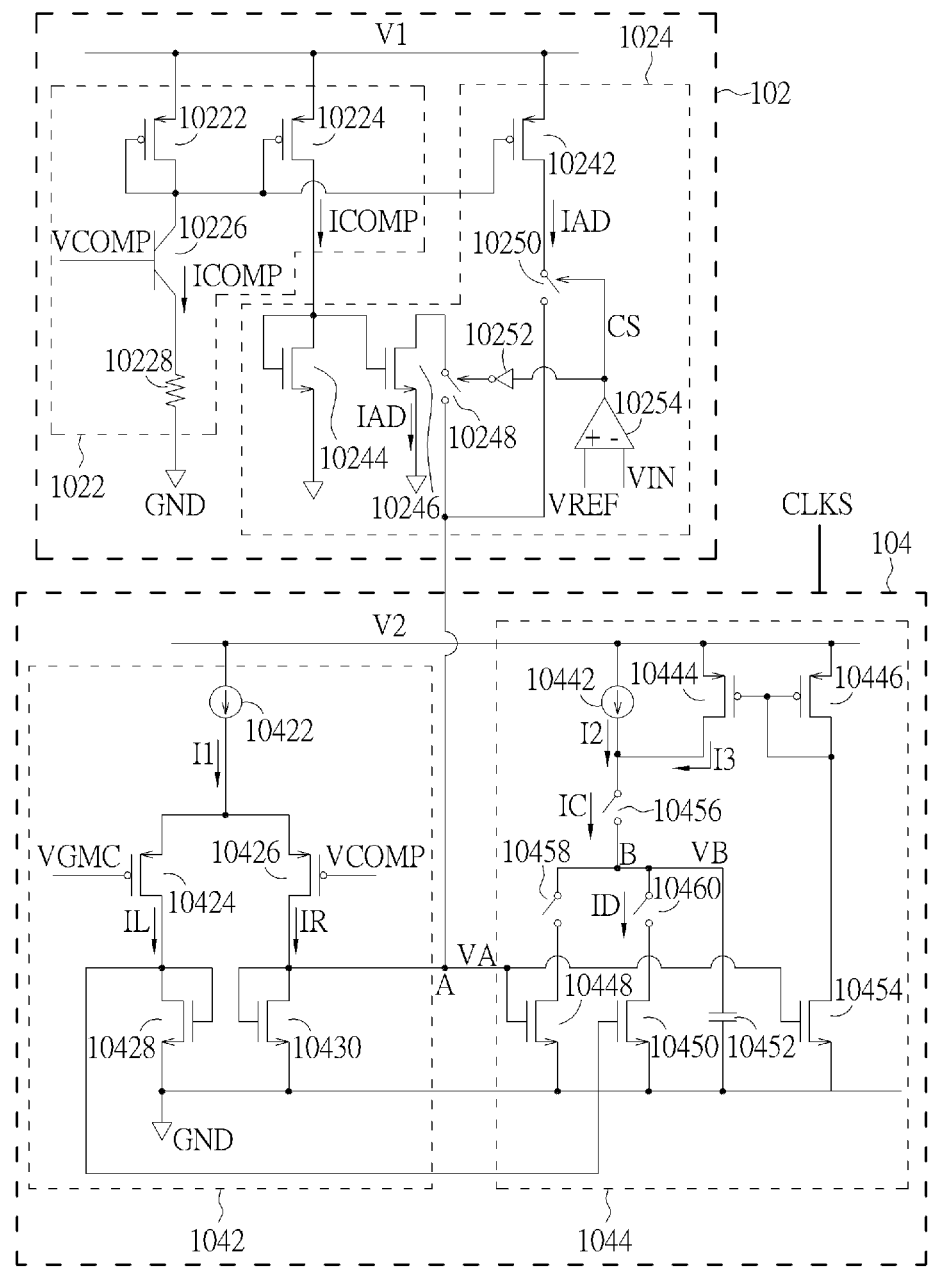
FIG. 2 is a diagram illustrating the compensation module and the oscillation module.

Please refer to FIG. 2. FIG. 2 is a diagram illustrating the compensation module 102 and the oscillation module 104, wherein the compensation module 102 includes a voltage-to-current converting unit 1022 and an adjustment current generation unit 1024, the oscillation module 104 includes a differential unit 1042 and a clock signal generation unit 1044, the adjustment current generation unit 1024 is the coupled to the voltage-to-current converting unit 1022, and the differential unit 1042 is coupled to the clock signal generation unit 1044. As shown in FIG. 2, the voltage-to-current converting unit 1022 includes a first P-type metal-oxide-semiconductor transistor 10222, a second P-type metal-oxide-semiconductor transistor 10224, a bipolar transistor 10226, and a resistor 10228. As shown in FIG. 2, the first P-type metal-oxide-semiconductor transistor 10222 has a first terminal for receiving a first voltage V1, a second terminal, and a third terminal coupled to the second terminal of the first P-type metal-oxide-semiconductor transistor 10222; the second P-type metal-oxide-semiconductor transistor 10224 has a first terminal for receiving the first voltage V1, a second terminal coupled to the second terminal of the first P-type metal-oxide-semiconductor transistor 10222, and a third terminal; the bipolar transistor 10226 has a first terminal coupled to the third terminal of the first P-type metal-oxide-semiconductor transistor 10222, a second terminal for receiving the compensation voltage VCOMP, and a third terminal; and the resistor 10228 has a first terminal coupled to the third terminal of the bipolar transistor 10226, and a second terminal coupled to ground GND.

As shown in FIG. 2, the adjustment current generation unit 1024 includes a third P-type metal-oxide-semiconductor transistor 10242, a first N-type metal-oxide-semiconductor transistor 10244, a second N-type metal-oxide-semiconductor transistor 10246, a first switch 10248, a second switch 10250, an inverter 10252, and a comparator 10254. As shown in FIG. 2, the third P-type metal-oxide-semiconductor transistor 10242 has a first terminal for receiving the first voltage V1, a second terminal coupled to the second terminal of the second P-type metal-oxide-semiconductor transistor 10224, and a third terminal; the first N-type metal-oxide-semiconductor transistor 10244 has a first terminal coupled to the third terminal of the second P-type metal-oxide-semiconductor transistor 10224, a second terminal coupled to the first terminal of the first N-type metal-oxide-semiconductor transistor 10244, and a third terminal coupled to the ground GND; the second N-type metal-oxide-semiconductor transistor 10246 has a first terminal, a second terminal coupled to the first terminal of the first N-type metal-oxide-semiconductor transistor 10244, and a third terminal coupled to the ground GND; the first switch 10248 has a first terminal coupled to the first terminal of the second N-type metal-oxide-semiconductor transistor 10246, a control terminal, and a second terminal; the second switch 10250 has a first terminal coupled to the third terminal of the third P-type metal-oxide-semiconductor transistor 10242, a control terminal, and a second terminal coupled to the second terminal of the first switch 10248; the comparator 10254 has a first input terminal for receiving the reference voltage VREF, a second input terminal for the receiving DC voltage VIN, and an output terminal coupled to the control terminal of the second switch 10250; and the inverter 10252 has a first terminal coupled to the output terminal of the comparator 10254, and a second terminal coupled to the control terminal of the first switch 10248.

As shown in FIG. 2, the differential unit 1042 includes a first current source 10422, a fourth P-type metal-oxide-semiconductor transistor 10424, a fifth P-type metal-oxide-semiconductor transistor 10426, a third N-type metal-oxide-semiconductor transistor 10428, and a fourth N-type metal-oxide-semiconductor transistor 10430. As shown in FIG. 2, the first current source 10422 has a first terminal for receiving a second voltage V2, and a second terminal, wherein the second voltage V2 can be the same as or different from the first voltage V1, and the first current source 10422 is used for providing a first current I1; the fourth P-type metal-oxide-semiconductor transistor 10424 has a first terminal coupled to the second terminal of the first current source 10422, a second terminal for receiving the control voltage VGMC, and a third terminal; the fifth P-type metal-oxide-semiconductor transistor 10426 has a first terminal coupled to the second terminal of the first current source 10422, a second terminal for receiving the compensation voltage VCOMP, and a third terminal; the third N-type metal-oxide-semiconductor transistor 10428 has a first terminal coupled to the third terminal of the fourth P-type metal-oxide-semiconductor transistor 10424, a second terminal coupled to the first terminal of the third N-type metal-oxide-semiconductor transistor 10428, and a third terminal coupled to the ground GND; and the fourth N-type metal-oxide-semiconductor transistor 10430 has a first terminal coupled to the third terminal of the fifth P-type metal-oxide-semiconductor transistor 10426, a second terminal coupled to the first terminal of the fourth N-type metal-oxide-semiconductor transistor 10430, and a third terminal coupled to the ground GND.

As shown in FIG. 2, the clock signal generation unit 1044 includes a second current source 10442, a sixth P-type metal-oxide-semiconductor transistor 10444, a seventh P-type metal-oxide-semiconductor transistor 10446, a fifth N-type metal-oxide-semiconductor transistor 10448, a sixth N-type metal-oxide-semiconductor transistor 10450, a capacitor 10452, a seventh N-type metal-oxide-semiconductor transistor 10454, a third switch 10456, a fourth switch 10458, and a fifth switch 10460. As shown in FIG. 2, the second current source 10442 has a first terminal for receiving the second voltage V2, and a second terminal, wherein the second current source 10442 is used for providing a second current I2, the first current I1 is greater than the second current I2, and the second current I2 is greater than the adjustment current IAD; the sixth P-type metal-oxide-semiconductor transistor 10444 has a first terminal for receiving the second voltage V2, a second terminal, and a third terminal coupled to the second terminal of the second current source 10442; the seventh P-type metal-oxide-semiconductor transistor 10446 has a first terminal for receiving the second voltage V2, a second terminal coupled to the second terminal of the sixth P-type metal-oxide-semiconductor transistor 10444, and a third terminal coupled to the second terminal of the seventh P-type metal-oxide-semiconductor transistor 10446; the third switch 10456 has a first terminal coupled to the second terminal of the second current source 10442, a control terminal, and a second terminal; the fourth switch 10458 has a first terminal coupled to the second terminal of the third switch 10456, a control terminal, and a second terminal; the fifth N-type metal-oxide-semiconductor transistor 10448 has a first terminal coupled to the second terminal of the fourth switch 10458, a second terminal coupled to the first terminal of the fourth N-type metal-oxide-semiconductor transistor 10430 and the second terminal of the first switch 10248, and a third terminal coupled to the ground GND; the fifth switch 10460 has a first terminal coupled to the second terminal of the third switch 10456, a control terminal, and a second terminal; the sixth N-type metal-oxide-semiconductor transistor 10450 has a first terminal coupled to the second terminal of the fifth switch 10460, a second terminal coupled to the first terminal of the third N-type metal-oxide-semiconductor transistor 10428, and a third terminal coupled to the ground GND; the capacitor 10452 has a first terminal coupled to the second terminal of the third switch 10456, and a second terminal coupled to the ground GND; and the seventh N-type metal-oxide-semiconductor transistor 10454 has a first terminal coupled to the third terminal of the seventh P-type metal-oxide-semiconductor transistor 10446, a second terminal coupled to the second terminal of the fifth N-type metal-oxide-semiconductor transistor 10448, and a third terminal coupled to the ground GND. In addition, when the third switch 10456 is turned on, the fourth switch 10458 and the fifth switch 10460 are turned off, and when the fourth switch 10458 and the fifth switch 10460 are turned on, the third switch 10456 is turned off, wherein the third switch 10456, the fourth switch 10458, and the fifth switch 10460 are controlled by a timing control unit (not shown in FIG. 2).

As shown in FIG. 2, the voltage-to-current converting unit 1022 can generate a compensation current ICOMP according to the compensation voltage VCOMP and the resistor 10228, and a first current mirror composed of the first P-type metal-oxide-semiconductor transistor 10222 and the second P-type metal-oxide-semiconductor transistor 10224 can mirror the compensation current ICOMP. In addition, as shown in FIG. 2, the third P-type metal-oxide-semiconductor transistor 10242 can generate the adjustment current IAD according to the compensation current ICOMP, and the second N-type metal-oxide-semiconductor transistor 10246 can also generate the adjustment current IAD according to the compensation current ICOMP. Therefore, when the DC voltage VIN is less than the reference voltage VREF, an output signal CS (logic-high) of the comparator 10254 can make the second switch 10250 be turned on, and make the first switch 10248 be turned off through the inverter 10252, so the third P-type metal-oxide-semiconductor transistor 10242 outputs the adjustment current IAD to a node A of the oscillation module 104; and when the DC voltage VIN is greater than the reference voltage VREF, the output signal CS (logic-low) of the comparator 10254 can make the second switch 10250 be turned off, and make the first switch 10248 be turned on through the inverter 10252, so the second N-type metal-oxide-semiconductor transistor 10246 sinks the adjustment current IAD from the node A of the oscillation module 104, wherein the adjustment current IAD sank from the node A of the oscillation module 104 by the second N-type metal-oxide-semiconductor transistor 10246 can be the same as or different from the adjustment current IAD outputted to the node A of the oscillation module 104 by the third P-type metal-oxide-semiconductor transistor 10242.

Figure 3:
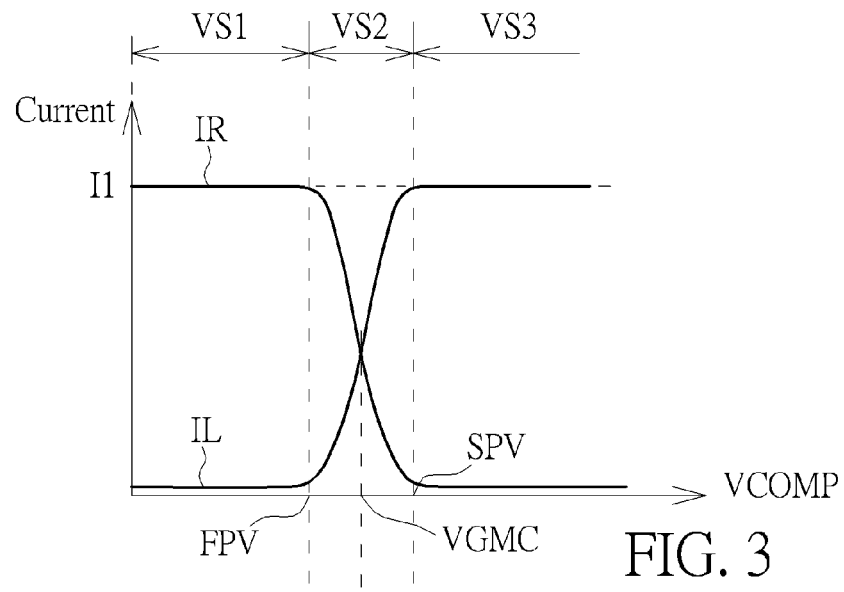
FIG. 3 is a diagram illustrating relationships between a control current flowing through the third N-type metal-oxide-semiconductor transistor, a control current flowing through the fourth N-type metal-oxide-semiconductor transistor, and the compensation voltage.
Figure 4:
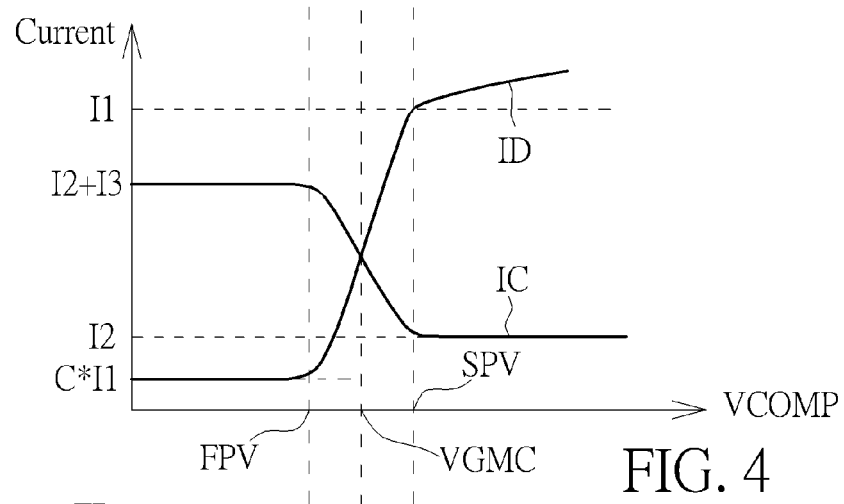
FIG. 4 is a diagram illustrating relationships between a charge current and a discharge current flowing through a node of the clock signal generation unit and the compensation voltage.
Figure 5:
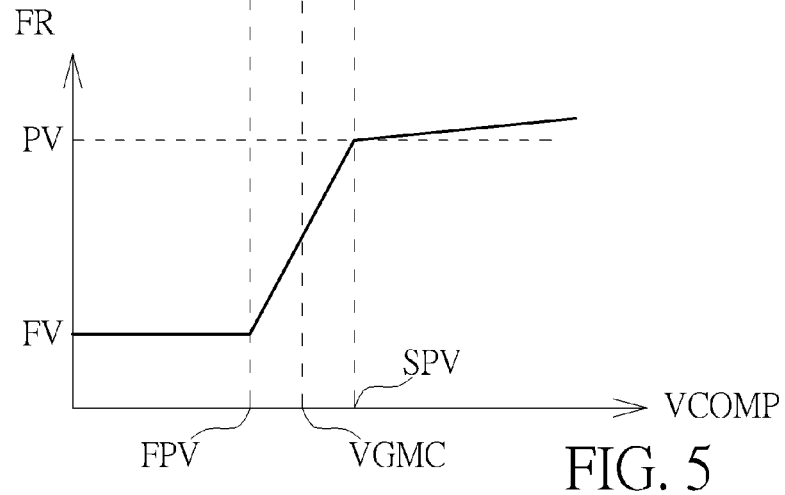
FIG. 5 is a diagram illustrating relationships between the compensation voltage and the frequency of the gate control signal.

Please refer to FIGS. 3-5. FIG. 3 is a diagram illustrating relationships between a control current IL flowing through the third N-type metal-oxide-semiconductor transistor 10428, a control current IR flowing through the fourth N-type metal-oxide-semiconductor transistor 10430, and the compensation voltage VCOMP, FIG. 4 is a diagram illustrating relationships between a charge current IC and a discharge current ID flowing through a node B of the clock signal generation unit 1044 and the compensation voltage VCOMP, and FIG. 5 is a diagram illustrating relationships between the compensation voltage VCOMP and the frequency FR of the gate control signal GCS, wherein FIGS. 3-5 correspond to the DC voltage VIN less than the reference voltage VREF. As shown in FIG. 3, in a voltage range VS1, because the fourth P-type metal-oxide-semiconductor transistor 10424 and the fifth P-type metal-oxide-semiconductor transistor 10426 can form a differential pair, when the compensation voltage VCOMP is less than the control voltage VGMC, the control current IR is greater than the control current IL, wherein maximums of the control current IR and the control current IL are the first current I1. As shown in FIG. 4, in the voltage range VS1 (the compensation voltage VCOMP is less than a first predetermined voltage FPV), because most of the first current I1 flow through the fifth P-type metal-oxide-semiconductor transistor 10426 and the fourth N-type metal-oxide-semiconductor transistor 10430 (that is, the control current IR is greater than the control current IL), a voltage VA of the node A is higher, resulting in a current I3 generated by a second current mirror composed of the sixth P-type metal-oxide-semiconductor transistor 10444, the seventh P-type metal-oxide-semiconductor transistor 10446, and the seventh N-type metal-oxide-semiconductor transistor 10454 being greater. Therefore, the charge current IC corresponding to the node B of the clock signal generation unit 1044 has a maximum (I2+I3). Further, as shown in FIG. 4, in the voltage range VS1, although the control current IR is greater than the control current IL, an appropriate design (e.g. a width-to-length ratio of the fifth N-type metal-oxide-semiconductor transistor 10448 is less than a width-to-length ratio of the fourth N-type metal-oxide-semiconductor transistor 10430) can make the discharge current ID corresponding to the node B of the clock signal generation unit 1044 have a minimum (C*I1), wherein C is a constant less than 1, and C*I1 is less than the second current I2. As shown in FIG. 5, in the voltage range VS1, because the charge current IC and the discharge current ID corresponding to the node B of the clock signal generation unit 1044 have the maximum (I2+I3) and the minimum (C*I1), respectively, and the adjustment current IAD is very small (because the adjustment current IAD corresponds to the compensation voltage VCOMP), the oscillation module 104 can output the clock signal CLKS according to a voltage VB of the node B, resulting in the frequency FR of the gate control signal GCS generated by the gate control signal generation unit 304 according to the clock signal CLKS having a first fixed value FV (e.g. 23 KHz) But, the present invention is not limited to the first fixed value FV being 23 KHz. In addition, in the voltage range VS1, the power converter 200 enters a burst mode.

As shown in FIG. 3, in a voltage range VS2 (the compensation voltage VCOMP is between the first predetermined voltage FPV and a second predetermined voltage SPV), because the differential pair composed of the fourth P-type metal-oxide-semiconductor transistor 10424 and the fifth P-type metal-oxide-semiconductor transistor 10426 starts to be switched (meanwhile, the compensation voltage VCOMP is gradually greater than the control voltage VGMC), the control current IR is decreased and the control current IL is increased, wherein width of the voltage range VS2 can be adjusted by width-to-length ratios of the fourth P-type metal-oxide-semiconductor transistor 10424 and the fifth P-type metal-oxide-semiconductor transistor 10426. As shown in FIG. 4, in the voltage range VS2, because the control current IR is decreased and the control current IL is increased, the voltage VA of the node A is decreased (meanwhile, although the adjustment current IAD is increased with increase of the compensation voltage VCOMP, increase of the adjustment current IAD does not stop decrease of the voltage VA of the node A because the adjustment current IAD is still much less than the first current I1), resulting in the current I3 generated by the second current mirror composed of the sixth P-type metal-oxide-semiconductor transistor 10444, the seventh P-type metal-oxide-semiconductor transistor 10446, and the seventh N-type metal-oxide-semiconductor transistor 10454 being smaller. Therefore, the charge current IC corresponding to the node B of the clock signal generation unit 1044 starts to be decreased from the maximum (I2+I3) to a minimum (I2). Further, as shown in FIG. 4, in the voltage range VS2, another appropriate design (e.g. a width-to-length ratio of the sixth N-type metal-oxide-semiconductor transistor 10450 is equal to a width-to-length ratio of the third N-type metal-oxide-semiconductor transistor 10428) can make the discharge current ID corresponding to the node B of the clock signal generation unit 1044 start to be increased from the minimum (C*I1) to a maximum (I1). But, the present invention is not limited to the width-to-length ratio of the sixth N-type metal-oxide-semiconductor transistor 10450 being equal to the width-to-length ratio of the third N-type metal-oxide-semiconductor transistor 10428. That is to say, the width-to-length ratio of the sixth N-type metal-oxide-semiconductor transistor 10450 can be also different from the width-to-length ratio of the third N-type metal-oxide-semiconductor transistor 10428. As shown in FIG. 5, in the voltage range VS2, because variation rate of the discharge current ID is greater than variation rate of the charge current IC, a discharge rate of the node B is increased, resulting in a frequency of the clock signal CLKS outputted by the oscillation module 104 according to the voltage VB of the node B being increased. Therefore, the frequency FR of the gate control signal GCS generated by the gate control signal generation unit 304 according to the clock signal CLKS starts to be increased from the first fixed value FV to a predetermined value PV (e.g. 65 KHz). But, the present invention is not limited to the predetermined value PV being 65 KHz.

As shown in FIG. 3, in a voltage range VS3 (the compensation voltage VCOMP is greater than the second predetermined voltage SPV), after the compensation voltage VCOMP is greater than the control voltage VGMC and the differential pair composed of the fourth P-type metal-oxide-semiconductor transistor 10424 and the fifth P-type metal-oxide-semiconductor transistor 10426 is switched, the control current IL is greater than the control current IR. As shown in FIG. 4, in the voltage range VS3, because the control current IR is reduced to a minimum, the voltage VA of the node A does not keep being reduced, instead of slowly being increased due to increase of the adjustment current IAD (because the adjustment current IAD is increased with increase of the compensation voltage VCOMP. In the voltage range VS3, because the voltage VA of the node A is slowly increased with increase of the compensation voltage VCOMP, another appropriate design can make an increase rate of the charge current IC be much less than increase rate of the discharge current ID. That is to say, as shown in FIG. 4, the discharge current ID keeps being slowly increased with increase of the compensation voltage VCOMP from the maximum (I1), and the charge current IC is almost unchanged. As shown in FIG. 5, in the voltage range VS3, because the increase rate of the charge current IC is much less than the increase rate of the discharge current ID, the discharge rate of the node B is slowly increased, resulting in the frequency of the clock signal CLKS outputted by the oscillation module 104 according to the voltage VB of the node B being slowly increased. Therefore, the frequency FR of the gate control signal GCS generated by the gate control signal generation unit 304 according to the clock signal CLKS can keep being slowly increased from the predetermined value PV (65 KHz). Further, as shown in FIG. 5, in the voltage range VS3, because the frequency FR of the gate control signal GCS generated by the gate control signal generation unit 304 according to the clock signal CLKS outputted by the oscillation module 104 is slowly increased, a first variation rate of the frequency FR of the gate control signal GCS during the voltage range VS2 is greater than a second variation rate of the frequency FR of the gate control signal GCS during the voltage range VS3.

Figure 6:
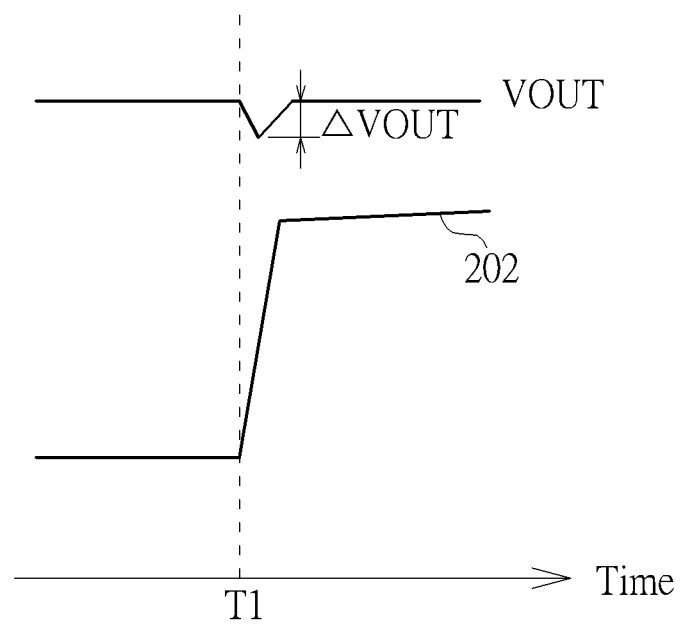
FIG. 6 is a diagram illustrating a response of an output voltage of the secondary side of the power converter when the load is suddenly increased.

As shown in FIG. 5, because the DC voltage VIN is less than the reference voltage VREF, that the frequency FR of the gate control signal GCS generated by the gate control signal generation unit 304 is slowly increased with increase of the compensation voltage VCOMP has advantages as follows:

First, a response of an output voltage VOUT of the secondary side SEC of the power converter 200 corresponding to the load 202 is better. Because the compensation voltage VCOMP during the voltage range VS3 is greater (that is, the load 202 is not a light load during the voltage range VS3), when the load 202 is suddenly increased (shown in FIG. 6), the output voltage VOUT can quickly respond variation of the load 202 according to equation (1), (2), (3), wherein equation (1) corresponds to a discontinuous current mode and equation (2) and equation (3) correspond to a continuous current mode:

$$G = \frac{1}{GFB \times Rcs} \sqrt{\frac{LP \times Rload \times FR}{2}} \quad (1)$$

$$G = \frac{Rload}{GFB \times Rcs \times N} \times \frac{1}{\frac{(1-D)^2}{\tau L} + 2M + 1} \quad (2)$$

$$\tau L = \frac{2LP \times N^2}{Rload \times \frac{1}{FR}} \quad (3)$$

As shown in equation (1), (2), G represents a gain corresponding to the output voltage VOUT, GFB represents an internal feedback from the secondary side SEC of the power converter 200 to the primary side PRI of the power converter 200, Rcs represents a resistance of a current sensing resistor 206 of the primary side PRI of the power converter 200, LP represents an inductance of a primary side winding 208 of the power converter 200, Rload represents a resistance of the load 202, N represents a turns ratio of the primary side winding 208 of the power converter 200 to a secondary side winding 210 of the power converter 200, D represents a duty cycle of the gate control signal GCS, and M is a constant. Therefore, as shown in equation (1), (2), (3), in the voltage range VS3, when the frequency FR of the gate control signal GCS generated by the gate control signal generation unit 304 is slowly increased with increase of the compensation voltage VCOMP, the gain G corresponding to the output voltage VOUT is also increased with increase of the frequency FR of the gate control signal GCS. Because the gain G corresponding to the output voltage VOUT is increased with increase of the frequency FR of the gate control signal GCS, the output voltage VOUT can quickly respond variation of the load 202. That is to say, the output voltage VOUT can quickly respond a voltage drop ΔVOUT caused by variation of the load 202 at time T1.

Second, ripples of the output voltage VOUT can be suppressed. According to equation (4), the ripples of the output voltage VOUT corresponding to the alternating current voltage VAC can be suppressed:

$$VR = \frac{RESR + 1}{8 \times FR \times COUT} \times \Delta VP \quad (4)$$

As shown in equation (4), VR represents the ripples of the output voltage VOUT, RESR represents a resistance of a parasitic resistor of a capacitor 212 coupled to the secondary side SEC of the power converter 200, COUT represents a capacitance of the capacitor 212, and ΔVP represents a peak-to-peak value of the alternating current voltage VAC. Therefore, as shown in equation (4), in the voltage range VS3, when the frequency FR of the gate control signal GCS is slowly increased with increase of the compensation voltage VCOMP, the ripples of the output voltage VOUTVR can be suppressed.

Third, conversion efficiency of the power converter 200 can be increased. According to equation (5), (6), in the voltage range VS3, when the frequency FR of the gate control signal GCS is slowly increased with increase of the compensation voltage VCOMP, a ratio η of input power PIN of the power converter 200 to output power POUT of the power converter 200 is decreased (that is, the conversion efficiency of the power converter 200 is increased), wherein equation (5), (6) corresponds to the discontinuous current mode and equation (7) correspond to the continuous current mode:

$$PIN = \frac{1}{2} \times LP \times \left(\frac{VCS}{RCS}\right)^2 \times FR \quad (5)$$

$$\frac{POUT}{\eta} = \frac{VOUT \times IOUT}{\eta} = \frac{1}{2} \times LP \times \left(\frac{VCS}{RCS}\right)^2 \times FR \quad (6)$$

$$\frac{VOUT \times IOUT}{\eta} = VIN \times D \times \left(\frac{VOCP}{RCS}\right) - \frac{VIN^2 \times D^2}{2 \times LP \times FR} \quad (7)$$

As shown in equation (5), (6), (7), VCS represents a detection voltage determined by the current sensing resistor 206 and a current IPRI flowing through the primary side PRI of the power converter 200, IOUT represents an output current of the secondary side SEC of the power converter 200, and VOCP represents an over-current protection voltage of the power converter 200. Therefore, as shown in equation (5), (6), (7), in the voltage range VS3, when the frequency FR of the gate control signal GCS is slowly increased with increase of the compensation voltage VCOMP, the ratio η of the input power PIN of the power converter 200 to the output power POUT of the power converter 200 is decreased.

Figure 7:
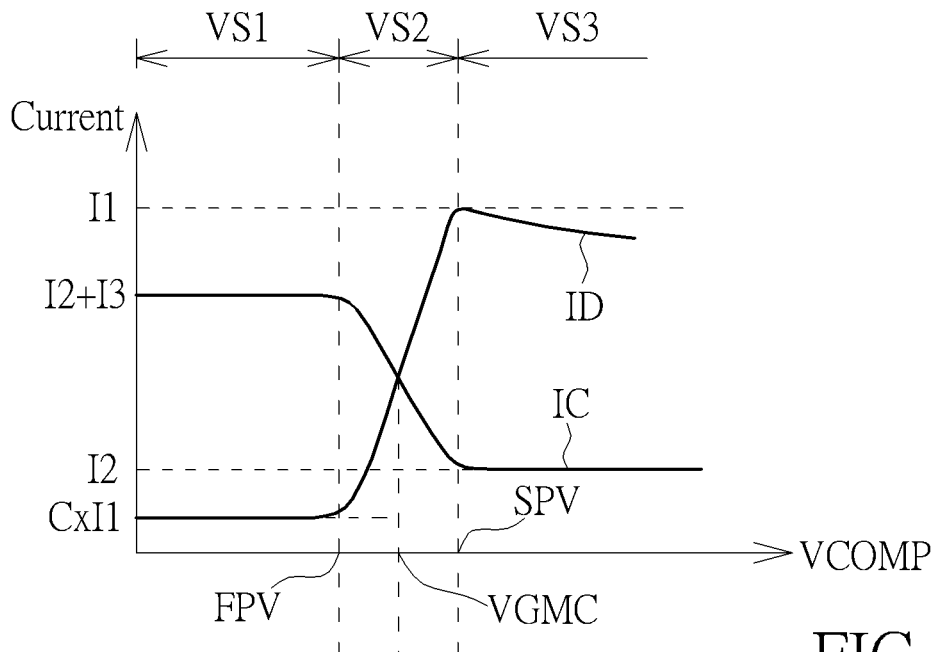
FIG. 7 is a diagram illustrating relationships between a charge current and a discharge current flowing through a node of the clock signal generation unit and the compensation voltage.
Figure 8:
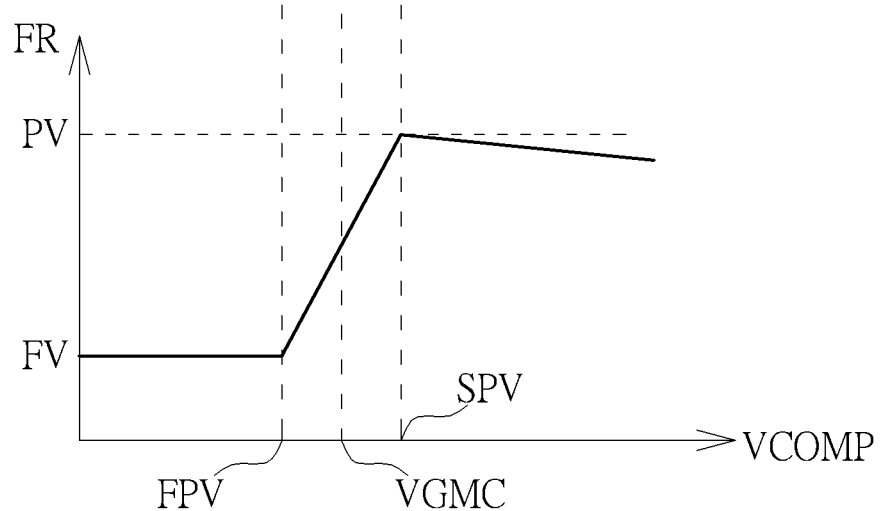
FIG. 8 is a diagram illustrating relationships between the compensation voltage and the frequency of the gate control signal.

In addition, as shown in FIG. 2, when the DC voltage VIN is greater than the reference voltage VREF, the output signal CS (logic-low) of the comparator 10254 can make the second switch 10250 be turned off, and make the first switch 10248 be turned on through the inverter 10252, the second N-type metal-oxide-semiconductor transistor 10246 can sink the adjustment current IAD from the node A of the oscillation module 104. Similarly, according to the above mentioned description corresponding to FIGS. 3-5, in a voltage range VS3 (the compensation voltage VCOMP is greater than the second predetermined voltage SPV) of FIG. 7, after the compensation voltage VCOMP is greater than the control voltage VGMC and the differential pair composed of the fourth P-type metal-oxide-semiconductor transistor 10424 and the fifth P-type metal-oxide-semiconductor transistor 10426 is switched, the control current IL is greater than the control current IR. Therefore, as shown in FIG. 7, in the voltage range VS3, after the control current IR is reduced to the minimum, the voltage VA of the node A can keep being reduced due to the second N-type metal-oxide-semiconductor transistor 10246 sinking the adjustment current IAD from the node A of the oscillation module 104 (because the adjustment current IAD is increased with increase of the compensation voltage VCOMP). In the voltage range VS3, because the voltage VA of the node A is slowly decreased with increase of the compensation voltage VCOMP, the discharge current ID starts to be slowly decreased with increase of the compensation voltage VCOMP from the maximum (I1). As shown in FIG. 8, in the voltage range VS3, because the voltage VA of the node A is slowly decreased with increase of the compensation voltage VCOMP, the discharge rate of the node B is slowly increased, resulting in the frequency of the clock signal CLKS outputted by the oscillation module 104 according to the voltage VB of the node B being slowly decreased. Therefore, the frequency FR of the gate control signal GCS generated by the gate control signal generation unit 304 according to the clock signal CLKS can start to be slowly decreased from the predetermined value PV (65 KHz). Further, structures of the voltage-to-current converting unit 1022, the adjustment current generation unit 1024, the differential unit 1042, and the clock signal generation unit 1044 shown in FIG. 2 are only used for describing the present invention. That is to say, the present invention is not limited to the structures of the voltage-to-current converting unit 1022, the adjustment current generation unit 1024, the differential unit 1042, and the clock signal generation unit 1044 shown in FIG. 2. In addition, when the DC voltage VIN is greater than the reference voltage VREF, switching loss of the power converter 200 is more significant than conduction loss of the power converter 200. Therefore, as shown in FIG. 8, that the frequency FR of the gate control signal GCS starts to be slowly decreased from the predetermined value PV (65 KHz) after the second predetermined voltage SPV can reduce the switching loss of the power converter 200. That is to say, the conversion efficiency of the power converter 200 becomes better because the frequency FR of the gate control signal GCS is slowly decreased in the voltage range VS3.

Figure 9:
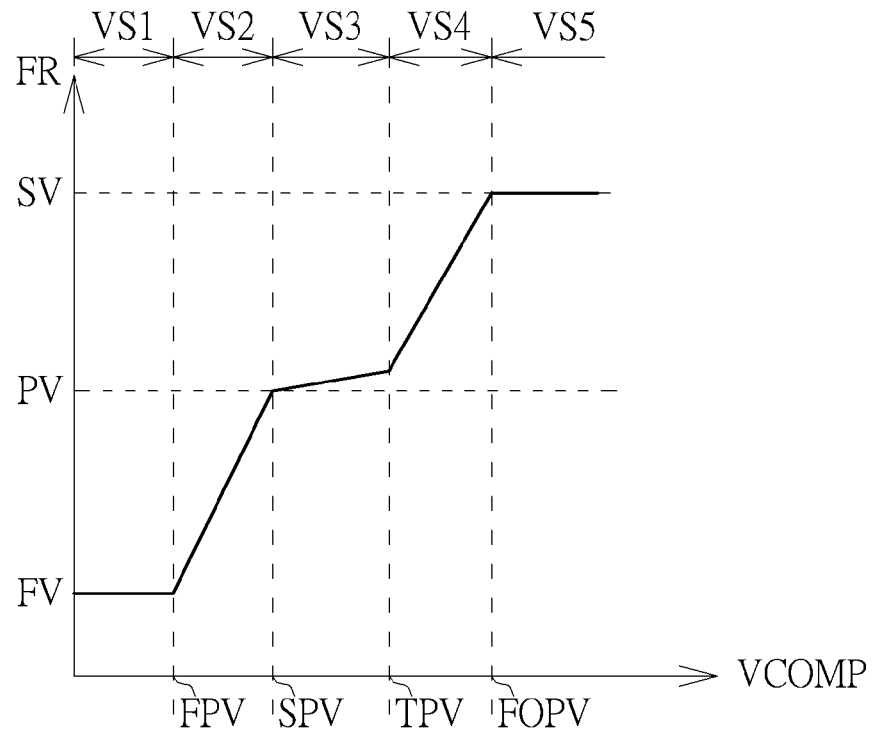
FIG. 9 is a diagram illustrating a relationship between the compensation voltage and the frequency of the gate control signal according to a second embodiment of the present invention.
Figure 10:
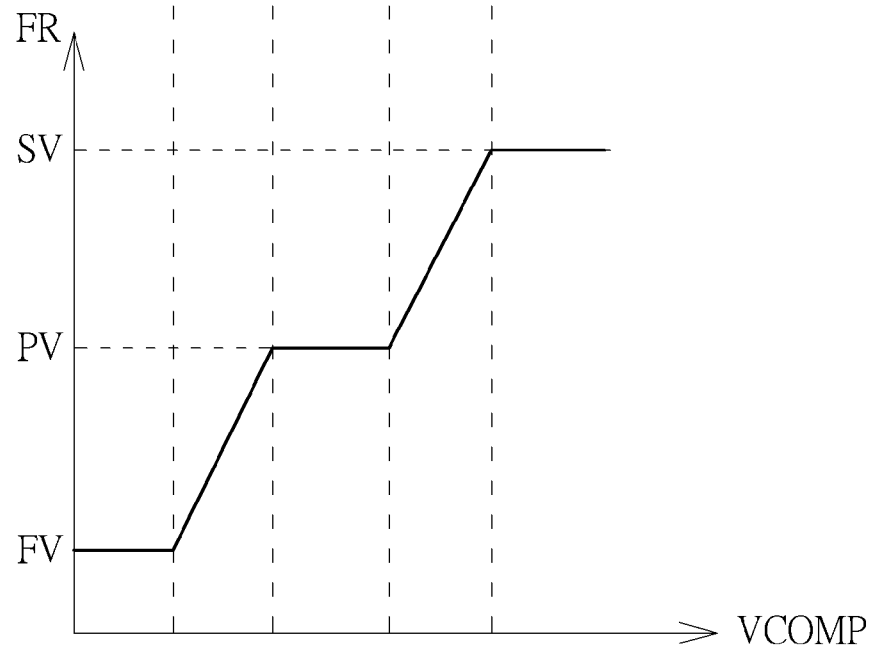
FIG. 10 is a diagram illustrating relationships between the compensation voltage and the frequency of the gate control signal according to another embodiment of the present invention.

Please refer to FIG. 9. FIG. 9 is a diagram illustrating a relationship between the compensation voltage VCOMP and the frequency FR of the gate control signal GCS according to a second embodiment of the present invention. As shown in FIG. 9, the oscillator 100 can be appropriately modified according to the above mentioned description corresponding to FIGS. 3-5 to make the frequency FR of the gate control signal GCS be varied with the compensation voltage VCOMP when the compensation voltage VCOMP is between the first predetermined voltage FPV and the second predetermined voltage SPV (the voltage range VS2), between the second predetermined voltage SPV and a third predetermined voltage TPV (the voltage range VS3), and between the third predetermined voltage TPV and a fourth predetermined voltage FOPV (a voltage range VS4), the frequency FR of the gate control signal GCS is the first fixed value FV when the compensation voltage VCOMP is less than the first predetermined voltage FPV, and the frequency FR of the gate control signal GCS is a second fixed value SV when the compensation voltage VCOMP is greater than the fourth predetermined voltage FOPV (a voltage range VS5), wherein the second variation rate of the frequency FR of the gate control signal GCS in the voltage range VS3 is less than the first variation rate of the frequency FR of the gate control signal GCS in the voltage range VS2 and a third variation rate of the frequency FR of the gate control signal GCS in the voltage range VS4. In addition, according to the above mentioned description corresponding to FIGS. 3-5, because the compensation module 102 can make the frequency FR of the gate control signal GCS 3 be slowly increased (as shown in FIG. 5) or be slowly decreased (as shown in FIG. 8) in the voltage range VS, in another embodiment of the present invention, deletion of the compensation module 102 can make the frequency FR of the gate control signal GCS be the predetermined value PV in the voltage range VS3 (as shown in FIG. 10).

Figure 11:
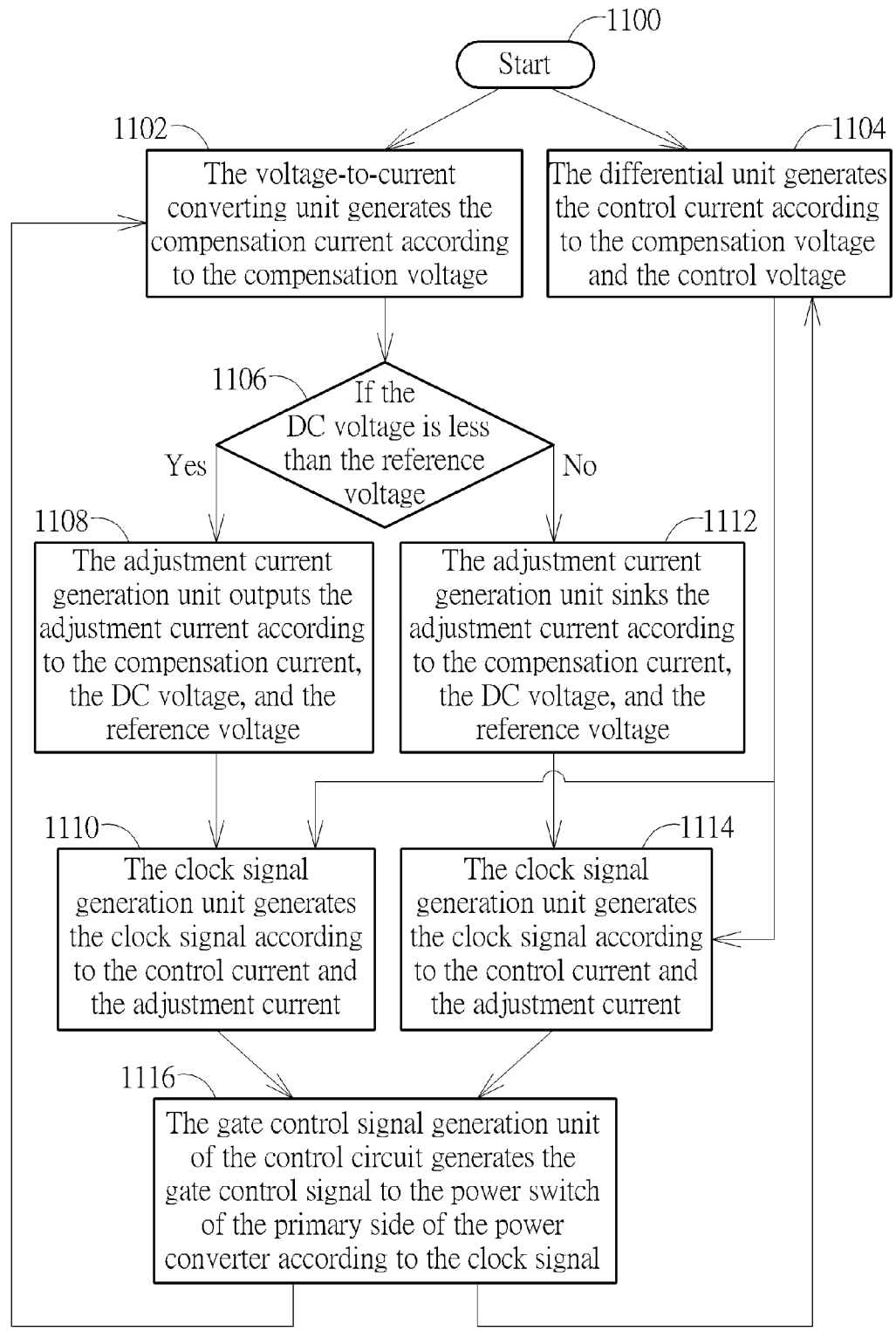
FIG. 11 is a flowchart illustrating a control method of an oscillator according to a third embodiment.

Please refer to FIGS. 1-8 and FIG. 11. FIG. 11 is a flowchart illustrating a control method of an oscillator according to a third embodiment. The control method in FIG. 11 is illustrated using the oscillator 100, the power converter 200, and the control circuit 300 in FIG. 1, and the compensation module 102, the voltage-to-current converting unit 1022, the adjustment current generation unit 1024, the oscillation module 104, the differential unit 1042, and the clock signal generation unit 1044 in FIG. 2. Detailed steps are as follows:

Step 1100: Start.

Step 1102: The voltage-to-current converting unit 1022 generates the compensation current ICOMP according to the compensation voltage VCOMP.

Step 1104: The differential unit 1042 generates the control current according to the compensation voltage VCOMP and the control voltage VGMC, go to Step 1110 or Step 1114.

Step 1106: If the DC voltage VIN is less than the reference voltage VREF; if yes, go to Step 1108; if no, go to Step 1112.

Step 1108: The adjustment current generation unit 1024 outputs the adjustment current ID according to the compensation current ICOMP, the DC voltage VIN, and the reference voltage VREF.

Step 1110: The clock signal generation unit 1044 generates the clock signal CLKS according to the control current and the adjustment current ID.

Step 1112: The adjustment current generation unit 1024 sinks the adjustment current ID according to the compensation current ICOMP, the DC voltage VIN, and the reference voltage VREF.

Step 1114: The clock signal generation unit 1044 generates the clock signal CLKS according to the control current and the adjustment current ID.

Step 1116: The gate control signal generation unit 304 of the control circuit 300 generates the gate control signal GCS to the power switch 204 of the primary side PRI of the power converter 200 according to the clock signal CLKS, go to Step 1102, 1104.

In Step 1102, as shown in FIG. 2, the voltage-to-current converting unit 1022 can generate the compensation current ICOMP according to the compensation voltage VCOMP and the resistor 10228, and the first current mirror composed of the first P-type metal-oxide-semiconductor transistor 10222 and the second P-type metal-oxide-semiconductor transistor 10224 can mirror the compensation current ICOMP. Further, as shown in FIG. 2, the third P-type metal-oxide-semiconductor transistor 10242 can generate the adjustment current IAD according to the compensation current ICOMP, and the second N-type metal-oxide-semiconductor transistor 10246 can also generate the adjustment current IAD according to the compensation current ICOMP. Therefore, in Step 1108, when the DC voltage VIN is less than the reference voltage VREF, the output signal CS (logic-high) of the comparator 10254 can make the second switch 10250 be turned on, and make the first switch 10248 be turned off through the inverter 10252, so the third P-type metal-oxide-semiconductor transistor 10242 outputs the adjustment current IAD to the node A of the oscillation module 104; and in Step 1112, when the DC voltage VIN is greater than the reference voltage VREF, the output signal CS (logic-low) of the comparator 10254 can make the second switch 10250 be turned off, and make the first switch 10248 be turned on through the inverter 10252, so the second N-type metal-oxide-semiconductor transistor 10246 sinks the adjustment current IAD from the node A of the oscillation module 104, wherein the adjustment current IAD sank from the node A of the oscillation module 104 by the second N-type metal-oxide-semiconductor transistor 10246 can be the same as or different from the adjustment current IAD outputted to the node A of the oscillation module 104 by the third P-type metal-oxide-semiconductor transistor 10242.

In Step 1104, as shown in FIG. 3, in the voltage range VS1, because the fourth P-type metal-oxide-semiconductor transistor 10424 and the fifth P-type metal-oxide-semiconductor transistor 10426 can form the differential pair, when the compensation voltage VCOMP is less than the control voltage VGMC, the control current IR is greater than the control current IL, wherein the maximums of the control current IR and the control current IL are the first current I1. In Step 1110, as shown in FIG. 4, in the voltage range VS1 (the compensation voltage VCOMP is less than the first predetermined voltage FPV), because most of the first current I1 flow through the fifth P-type metal-oxide-semiconductor transistor 10426 and the fourth N-type metal-oxide-semiconductor transistor 10430 (that is, the control current IR is greater than the control current IL), the voltage VA of the node A is higher, resulting in the current I3 generated by the second current mirror composed of the sixth P-type metal-oxide-semiconductor transistor 10444, the seventh P-type metal-oxide-semiconductor transistor 10446, and the seventh N-type metal-oxide-semiconductor transistor 10454 being greater. Therefore, the charge current IC corresponding to the node B of the clock signal generation unit 1044 has the maximum (I2+I3). Further, as shown in FIG. 4, in the voltage range VS1, although the control current IR is greater than the control current IL, an appropriate design (e.g. the width-to-length ratio of the fifth N-type metal-oxide-semiconductor transistor 10448 is less than the width-to-length ratio of the fourth N-type metal-oxide-semiconductor transistor 10430) can make the discharge current ID corresponding to the node B of the clock signal generation unit 1044 have the minimum (C*I1), wherein C is a constant less than 1, and C*I1 is less than the second current I2. In Step 1110, as shown in FIG. 5, in the voltage range VS1, because the charge current IC and the discharge current ID corresponding to the node B of the clock signal generation unit 1044 have the maximum (I2+I3) and the minimum (C*I1), respectively, and the adjustment current IAD is very small (because the adjustment current IAD corresponds to the compensation voltage VCOMP), the clock signal CLKS outputted by the oscillation module 104 according to the voltage VB of the node B can make the frequency FR of the gate control signal GCS generated by the gate control signal generation unit 304 according to the clock signal CLKS have the first fixed value FV (e.g. 23 KHz). But, the present invention is not limited to the first fixed value FV being 23 KHz.

In Step 1104, as shown in FIG. 3, in the voltage range VS2 (the compensation voltage VCOMP is between the first predetermined voltage FPV and the second predetermined voltage SPV), because the differential pair composed of the fourth P-type metal-oxide-semiconductor transistor 10424 and the fifth P-type metal-oxide-semiconductor transistor 10426 starts to be switched (meanwhile, the compensation voltage VCOMP is gradually greater than the control voltage VGMC), the control current IR is decreased and the control current IL is increased, wherein the width of the voltage range VS2 can be adjusted by width-to-length ratios of the fourth P-type metal-oxide-semiconductor transistor 10424 and the fifth P-type metal-oxide-semiconductor transistor 10426. In Step 1110, as shown in FIG. 4, in the voltage range VS2, because the control current IR is decreased and the control current IL is increased, the voltage VA of the node A is decreased (meanwhile, although the adjustment current IAD is increased with increase of the compensation voltage VCOMP, increase of the adjustment current IAD does not stop decrease of the voltage VA of the node A because the adjustment current IAD is still much less than the first current I1), resulting in the current I3 generated by the second current mirror composed of the sixth P-type metal-oxide-semiconductor transistor 10444, the seventh P-type metal-oxide-semiconductor transistor 10446, and the seventh N-type metal-oxide-semiconductor transistor 10454 being smaller. Therefore, the charge current IC corresponding to the node B of the clock signal generation unit 1044 starts to be decreased from the maximum (I2+I3) to the minimum (I2). Further, as shown in FIG. 4, in the voltage range VS2, another appropriate design (e.g. the width-to-length ratio of the sixth N-type metal-oxide-semiconductor transistor 10450 is equal to the width-to-length ratio of the third N-type metal-oxide-semiconductor transistor 10428) can make the discharge current ID corresponding to the node B of the clock signal generation unit 1044 start to be increased from the minimum (C*I1) to the maximum (I1). But, the present invention is not limited to the width-to-length ratio of the sixth N-type metal-oxide-semiconductor transistor 10450 being equal to the width-to-length ratio of the third N-type metal-oxide-semiconductor transistor 10428. That is to say, the width-to-length ratio of the sixth N-type metal-oxide-semiconductor transistor 10450 can be also different from the width-to-length ratio of the third N-type metal-oxide-semiconductor transistor 10428. In Step 1110, as shown in FIG. 5, in the voltage range VS2, because variation rate of the discharge current ID is greater than variation rate of the charge current IC, the discharge rate of the node B is increased, resulting in the frequency of the clock signal CLKS outputted by the oscillation module 104 according to the voltage VB of the node B being increased. Therefore, the frequency FR of the gate control signal GCS generated by the gate control signal generation unit 304 according to the clock signal CLKS starts to be increased from the first fixed value FV to the predetermined value PV (e.g. 65 KHz). But, the present invention is not limited to the predetermined value PV being 65 KHz.

In Step 1104, as shown in FIG. 3, in the voltage range VS3 (the compensation voltage VCOMP is greater than the second predetermined voltage SPV), after the compensation voltage VCOMP is greater than the control voltage VGMC and the differential pair composed of the fourth P-type metal-oxide-semiconductor transistor 10424 and the fifth P-type metal-oxide-semiconductor transistor 10426 is switched, the control current IL is greater than the control current IR. In Step 1110, as shown in FIG. 4, in the voltage range VS3, because the control current IR is reduced to the minimum, the voltage VA of the node A does not keep being reduced, instead of slowly being increased due to increase of the adjustment current IAD (because the adjustment current IAD is increased with increase of the compensation voltage VCOMP). In the voltage range VS3, because the voltage VA of the node A is slowly increased with increase of the compensation voltage VCOMP, another appropriate design can make an increase rate of the charge current IC be much less than increase rate of the discharge current ID. That is to say, as shown in FIG. 4, the discharge current ID keeps being slowly increased with increase of the compensation voltage VCOMP from the maximum (I1), and the charge current IC is almost unchanged. In Step 1110, as shown in FIG. 5, in the voltage range VS3, because the increase rate of the charge current IC is much less than the increase rate of the discharge current ID, the discharge rate of the node B is slowly increased, resulting in the frequency of the clock signal CLKS outputted by the oscillation module 104 according to the voltage VB of the node B being slowly increased. Therefore, in Step 1116, the frequency FR of the gate control signal GCS generated by the gate control signal generation unit 304 according to the clock signal CLKS can keep being slowly increased from the predetermined value PV (65 KHz). Further, as shown in FIG. 5, in the voltage range VS3, because the frequency FR of the gate control signal GCS generated by the gate control signal generation unit 304 according to the clock signal CLKS outputted by the oscillation module 104 is slowly increased, the first variation rate of the frequency FR of the gate control signal GCS during the voltage range VS2 is greater than the second variation rate of the frequency FR of the gate control signal GCS during the voltage range VS3.

In addition, in Step 1112, as shown in FIG. 2, when the DC voltage VIN is greater than the reference voltage VREF, the output signal CS (logic-low) of the comparator 10254 can make the second switch 10250 be turned off, and make the first switch 10248 be turned on through the inverter 10252, the second N-type metal-oxide-semiconductor transistor 10246 can sink the adjustment current IAD from the node A of the oscillation module 104. Similarly, in Step 1114, according to the above mentioned description corresponding to FIGS. 3-5, in the voltage range VS3 (the compensation voltage VCOMP is greater than the second predetermined voltage SPV) of FIG. 7, after the compensation voltage VCOMP is greater than the control voltage VGMC and the differential pair composed of the fourth P-type metal-oxide-semiconductor transistor 10424 and the fifth P-type metal-oxide-semiconductor transistor 10426 is switched, the control current IL is greater than the control current IR. Therefore, as shown in FIG. 7, in the voltage range VS3, after the control current IR is reduced to the minimum, the voltage VA of the node A can keep being reduced due to the second N-type metal-oxide-semiconductor transistor 10246 sinking the adjustment current IAD from the node A of the oscillation module 104 (because the adjustment current IAD is increased with increase of the compensation voltage VCOMP). In the voltage range VS3, because the voltage VA of the node A is slowly decreased with increase of the compensation voltage VCOMP, the discharge current ID starts to be slowly decreased with increase of the compensation voltage VCOMP from the maximum (I1). In Step 1114, as shown in FIG. 8, in the voltage range VS3, because the voltage VA of the node A is slowly decreased with increase of the compensation voltage VCOMP, the discharge rate of the node B is slowly increased, resulting in the frequency of the clock signal CLKS outputted by the oscillation module 104 according to the voltage VB of the node B being slowly decreased. Therefore, in Step 1116, the frequency FR of the gate control signal GCS generated by the gate control signal generation unit 304 according to the clock signal CLKS can start to be slowly decreased from the predetermined value PV (65 KHz).

To sum up, the oscillator applied to the control circuit of the power converter and the control method thereof can utilize the compensation module to output or sink the adjustment current according to the compensation voltage corresponding to the load of the secondary side of the power converter, the DC voltage of the primary side of the power converter, and the reference voltage, and utilize the oscillation module to output the clock signal according to the compensation voltage, the control voltage, and the adjustment current, wherein the clock signal can be slowly varied with the compensation voltage when the load is middle or heavy. Because the clock signal can be slowly varied with the compensation voltage when the load is middle or heavy, the frequency of the gate control signal generated by the gate control signal generation unit within the control circuit to the power switch of the primary side of the power converter can be also slowly varied with the compensation voltage when the load is middle or heavy. Because the frequency of the gate control signal can be also slowly varied with the compensation voltage when the load is middle or heavy, compared to the prior art, the present invention has advantages as follows: first, the response of the output voltage of the secondary side of the power converter corresponding to the load is better; second, the ripples of the output voltage can be suppressed; third, the conversion efficiency of the power converter can be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An oscillator applied to a control circuit of a power converter, the oscillator comprising:
  a compensation module for outputting or sinking an adjustment current according to a compensation volt- age corresponding to a load of a secondary side of the power converter, a direct current (DC) voltage of a primary side of the power converter, and a reference voltage, wherein the compensation module comprises:
- a voltage-to-current converting unit for generating a compensation current according to the compensation voltage; and
- an adjustment current generation unit coupled to the voltage-to-current converting unit for outputting or sinking the adjustment current according to the compensation current, the DC voltage, and the reference voltage, wherein when the DC voltage is less than the reference voltage, the adjustment current generation unit outputs the adjustment current, and when the DC voltage is greater than the reference voltage, the adjustment current generation unit sinks the adjustment current; and
- an oscillation module for outputting a clock signal according to the compensation voltage, a control voltage within the control circuit, and the adjustment current, wherein the control circuit generates a gate control signal to a power switch of the primary side of the power converter according to the clock signal;

wherein when the compensation voltage is less than a first predetermined voltage, a frequency of the gate control signal is a first fixed value, and when the compensation voltage is between the first predetermined voltage and a second predetermined voltage and greater than the second predetermined voltage, the frequency is varied with the compensation voltage.

2. The oscillator of claim 1, wherein a first variation rate of the frequency when the compensation voltage is between the first predetermined voltage and the second predetermined voltage is greater than a second variation rate of the frequency when the compensation voltage is greater than the second predetermined voltage.

3. An oscillator applied to a control circuit of a power converter, the oscillator comprising:
- a compensation module for outputting or sinking an adjustment current according to a compensation voltage corresponding to a load of a secondary side of the power converter, a DC voltage of a primary side of the power converter, and a reference voltage; and
- an oscillation module for outputting a clock signal according to the compensation voltage, a control voltage within the control circuit, and the adjustment current, wherein the control circuit generates a gate control signal to a power switch of the primary side of the power converter according to the clock signal, wherein the oscillation module comprises:
  - a differential unit for generating a control current according to the compensation voltage and the control voltage; and
  - a clock signal generation unit for generating the clock signal according to the control current and the adjustment current;

wherein when the compensation voltage is less than a first predetermined voltage, a frequency of the gate control signal is a first fixed value, and when the compensation voltage is between the first predetermined voltage and a second predetermined voltage and greater than the second predetermined voltage, the frequency is varied with the compensation voltage.

4. The oscillator of claim 1, wherein the gate control signal is a pulse width modulation signal.

5. The oscillator of claim 1, wherein the control voltage between the first predetermined voltage and the second predetermined voltage.

6. An oscillator applied to a control circuit of a power converter, the oscillator comprising:
- a compensation module for outputting or sinking an adjustment current according to a compensation voltage corresponding to a load of a secondary side of the power converter, a DC voltage of a primary side of the power converter, and a reference voltage; and
- an oscillation module for outputting a clock signal according to the compensation voltage, a control voltage within the control circuit, and the adjustment current, wherein the control circuit generates a gate control signal to a power switch of the primary side of the power converter according to the clock signal;

wherein when the compensation voltage is less than a first predetermined voltage, a frequency of the gate control signal is a first fixed value, and when the compensation voltage is between the first predetermined voltage and a second predetermined voltage, between the second predetermined voltage and a third predetermined voltage, and between the third predetermined voltage and a fourth predetermined voltage, the frequency is varied with the compensation voltage, and when the compensation voltage is greater than the fourth predetermined voltage, the frequency of the gate control signal is a second fixed value.

7. An oscillator applied to a control circuit of a power converter, the oscillator comprising:
- a compensation module for outputting or sinking an adjustment current according to a compensation voltage corresponding to a load of a secondary side of the power converter, a DC voltage of a primary side of the power converter, and a reference voltage; and
- an oscillation module for outputting a clock signal according to the compensation voltage, a control voltage within the control circuit, and the adjustment current, wherein the control circuit generates a gate control signal to a power switch of the primary side of the power converter according to the clock signal;

wherein when the compensation voltage is less than a first predetermined voltage, a frequency of the gate control signal is a first fixed value, and when the compensation voltage is between the first predetermined voltage and a second predetermined voltage, between the second predetermined voltage and a third predetermined voltage, and between the third predetermined voltage and a fourth predetermined voltage, the frequency is varied with the compensation voltage, and when the compensation voltage is greater than the fourth predetermined voltage, the frequency of the gate control signal is a second fixed value;

wherein a second variation rate of the frequency when the compensation voltage is between the second predetermined voltage and the third predetermined voltage is less than a first variation rate of the frequency when the compensation voltage is between the first predetermined voltage and the second predetermined voltage and a third variation rate of the frequency when the compensation voltage is between the third predetermined voltage and the fourth predetermined voltage.

8. An oscillator applied to a control circuit of a power converter, the oscillator comprising:
- an oscillation module for outputting a clock signal according to a compensation voltage corresponding to a load of a secondary side of the power converter and at least one control voltage within the control circuit, wherein the control circuit generates a gate control signal to a power switch of a primary side of the power converter according to the clock signal;

wherein when the compensation voltage is less than a first predetermined voltage, a frequency of the gate control signal is a first fixed value, when the compensation voltage is between a second predetermined voltage and a third predetermined voltage, the frequency of the gate control signal is a second fixed value, when the compensation voltage is greater than a fourth predetermined voltage, the frequency of the gate control signal is a third fixed value, and when the compensation voltage is between the first predetermined voltage and the second predetermined voltage, and between the third predetermined voltage and the fourth predetermined voltage, the frequency is varied with the compensation voltage.

9. A control method of an oscillator, wherein the oscillator is applied to a control circuit of a power converter, the oscillator comprises a compensation module and an oscillation module, the compensation module comprises a voltage-to-current converting unit and an adjustment current generation unit, and the oscillation module comprises a differential unit and a clock signal generation unit, the control method comprising:

the compensation module outputting or sinking an adjustment current according to a compensation voltage corresponding to a load of a secondary side of the power converter, a DC voltage of a primary side of the power converter, and a reference voltage, wherein when the DC voltage is less than the reference voltage, the compensation module outputs the adjustment current, and when the DC voltage is greater than the reference voltage, the compensation module sinks the adjustment current; and the oscillation module outputting a clock signal according to the compensation voltage, a control voltage within the control circuit, and the adjustment current;

wherein the control circuit generates a gate control signal to a power switch of the primary side of the power converter according to the clock signal; when the compensation voltage is less than a first predetermined voltage, a frequency of the gate control signal is a first fixed value, and when the compensation voltage is between the first predetermined voltage and a second predetermined voltage and greater than the second predetermined voltage, the frequency is varied with the compensation voltage.

10. The control method of claim 9, wherein a first variation rate of the frequency when the compensation voltage is between the first predetermined voltage and the second predetermined voltage is greater than a second variation rate of the frequency when the compensation voltage is greater than the second predetermined voltage.

11. The control method of claim 9, wherein the compensation module outputting or sinking the adjustment current according to the compensation voltage corresponding to the load of the secondary side of the power converter, the DC voltage of the primary side of the power converter, and the reference voltage comprises:

the voltage-to-current converting unit generating a compensation current according to the compensation voltage; and the adjustment current generation unit outputting or sinking the adjustment current according to the compensation current, the DC voltage, and the reference voltage, wherein when the DC voltage is less than the reference voltage, the adjustment current generation unit outputs the adjustment current, and when the DC voltage is greater than the reference voltage, the adjustment current generation unit sinks the adjustment current.

12. The control method of claim 9, wherein the oscillation module outputting the clock signal according to the compensation voltage, the control voltage within the control circuit, and the adjustment current comprises:

the differential unit generating a control current according to the compensation voltage and the control voltage; and the clock signal generation unit generating the clock signal according to the control current and the adjustment current.

13. The control method of claim 9, wherein the gate control signal is a pulse width modulation signal.

14. The control method of claim 9, wherein the control voltage between the first predetermined voltage and the second predetermined voltage.

15. The control method of claim 9, wherein when the compensation voltage is between the second predetermined voltage and a third predetermined voltage, and between the third predetermined voltage and a fourth predetermined voltage, the frequency is varied with the compensation voltage, and when the compensation voltage is greater than the fourth predetermined voltage, the frequency of the gate control signal is a second fixed value.

16. The control method of claim 15, wherein a second variation rate of the frequency when the compensation voltage is between the second predetermined voltage and the third predetermined voltage is less than a first variation rate of the frequency when the compensation voltage is between the first predetermined voltage and the second predetermined voltage and a third variation rate of the frequency when the compensation voltage is between the third predetermined voltage and the fourth predetermined voltage.

* * * * *